United States Patent
Parcell

[15] 3,674,834
[45] July 4, 1972

[54] OXIMES OF 3,4-DIMETHOXYPHENYLPYRUVIC ACID ESTERS

[72] Inventor: Robert F. Parcell, Ann Arbor, Mich.
[73] Assignee: Parke, Davis & Company, Detroit, Mich.
[22] Filed: March 30, 1970
[21] Appl. No.: 24,014

[52] U.S. Cl. ..........................................260/471 A, 260/519
[51] Int. Cl. ......................................................C07c 131/00
[58] Field of Search ........................................260/471 A, 519

[56] References Cited

OTHER PUBLICATIONS

Fieser, L. F. Organic Chemistry, 3rd Edtn. (1956) pub. by Reinhold Pub. Corp., London Qd257Fs, pages 440 and 704 cited

*Primary Examiner*—Lorraine A. Weinberger
*Assistant Examiner*—L. Arnold Thaxton
*Attorney*—Robert R. Adams, David B. Ehrlinger, George M. Richards and Edward J. Gall

[57] ABSTRACT

Oximes of 3,4-dimethoxyphenylpyruvic acid, lower alkyl esters, and their salts. These compounds can be produced by reacting a 3,4-dimethoxybenzylmalonic acid, di- (lower alkyl) ester with a lower alkyl nitrite in the presence of a base. The oximes are then converted by reductive acetylation, selective hydrolysis of the lower alkyl ester group, and acidification to N-acetyl-3-(3,4-dimethoxyphenyl)alanine. The latter compound is converted to 3-(3,4-dimethoxyphenyl)-L-alanine by the enzymatic action of an acylase and then to 3-(3,4-dihydroxyphenyl)-L-alanine by cleavage of the ether groups.

5 Claims, No Drawings

OXIMES OF 3,4-DIMETHOXYPHENYLPYRUVIC ACID ESTERS

SUMMARY AND DETAILED DESCRIPTION

The present invention relates to new organic nitrogen compounds. More particularly, the invention relates to new oximes of 3,4-dimethoxyphenylpyruvic acid, lower alkyl esters, and salts thereof, to methods for their production, and to methods for their use as chemical intermediates. In the form of the free oximes, the compounds of the invention can be represented by the formula

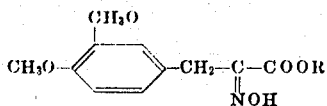

In this formula, R represents a lower alkyl group of not more than six carbon atoms and preferably represents methyl or ethyl.

In accordance with the invention, the compounds of the foregoing formula and their salts can be produced by reacting a 3,4-dimethoxybenzylmalonic acid, di-(lower alkyl) ester of the formula

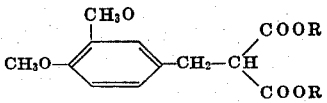

with a lower alkyl nitrite of the formula

R'—ONO under substantially anhydrous conditions in the presence of a base; where R is as defined before and R' represents a lower alkyl group of not more than six carbon atoms such as methyl, ethyl, isopropyl, n-propyl, n-butyl, and isopentyl. Preferably R' represents methyl. Some examples of suitable bases are alkali metal alkoxides such as sodium methoxide and sodium ethoxide. Some examples of suitable solvents for the reaction are lower alkanols such as methanol, ethanol, and isopropyl alcohol. In order to avoid the possible effect of ester interchange in the reaction, it is preferred that the base and the solvent be chosen so that the alkyl group present in the 3,4-dimethoxybenzylmalonic acid, di-(lower alkyl) ester, base, and solvent, are identical. For example, using 3,4-dimethoxybenzylmalonic acid, dimethyl ester as starting material, the preferred base is sodium methoxide and the preferred solvent is methanol. The reaction can be carried out over a relatively wide range of times and temperatures. The lower limit of the temperature range is not critical. In general, a temperature of −50° to 40° C. for 30 minutes to 24 hours is satisfactory. The preferred conditions are from −20° to 20° C. for from 1 to 4 hours. The 3,4-dimethoxybenzylmalonic acid, di-(lower alkyl) ester, lower alkyl nitrite, and base can be used in equimolar quantities although it is preferred to use a small to moderate excess of the lower alkyl nitrite. The product is isolated directly as a salt or following acidification, as the free oxime or acid-addition salt. Excessive treatment with acid is avoided in order to minimize hydrolysis of the oxime. The preferred procedure is to acidify the reaction mixture to the point of neutrality with concentrated sulfuric acid (to maintain substantially anhydrous conditions) and then concentrate, dilute with water, and chill the reaction mixture to isolate the free oxime.

Starting materials required for use in the foregoing process can be prepared by any of a variety of methods. For example, 3,4-dimethoxybenzaldehyde (veratraldehyde) is reacted with a malonic acid, di-(lower alkyl) ester of the formula

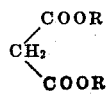

and the resulting 3,4-dimethoxybenzylidenemalonic acid, di-(lower alkyl) ester of the formula

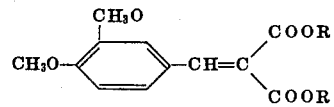

is hydrogenated in the presence of a Raney nickel catalyst to produce a 3,4-dimethoxybenzylmalonic acid, di-(lower alkyl) ester. In the above formulas, R is as defined before. Alternatively, 3,4-dimethoxybenzyl chloride (veratryl chloride) is reacted under anhydrous conditions in the presence of a strong base with a malonic acid, di-(lower alkyl) ester of the formula indicated above to produce a 3,4-dimethoxybenzylmalonic acid, di-(lower alkyl) ester. Suitable procedures for carrying out the above reactions are illustrated in British Patent specification No. 1,114,426.

The oximes of the invention exist in free form and in salt forms. They form salts by reaction with bases or with acids under mild or non-hydrolytic conditions. Excessive treatment with an aqueous base or an aqueous acid is avoided in order to prevent hydrolysis of the oxime group. Some examples of typical salts are the alkali metal salts such as the sodium salt and the potassium salt; and mineral acid salts such as the hydrochloride. The free oximes and their salts differ in solubility properties but in general are otherwise equivalent.

Also in accordance with the invention, N-acetyl-3-(3,4-dimethoxyphenyl)alanine can be produced by the sequence which comprises (a) reacting a 3,4-dimethoxyphenylpyruvic acid, lower alkyl ester, oxime with hydrogen and acetic anhydride in the presence of a hydrogenation catalyst, (b) reacting the resulting N-acetyl-3-(3,4-dimethoxyphenyl)alanine, lower alkyl ester, with an aqueous base at a pH of 9 to 13 whereby selective hydrolysis of the lower alkyl ester group occurs without substantial hydrolysis of the N-acetyl group, and (c) acidifying the resulting salt of N-acetyl-3-(3,4-dimethoxyphenyl)alanine whereby the said salt is converted to N-acetyl-3-(3,4-dimethoxyphenyl)alanine in free acid form. In the first step of this sequence a suitable hydrogenation catalyst is a noble metal catalyst and especially palladium which can conveniently be used in the form of palladium on charcoal. A suitable solvent for the reaction is acetic acid. The oxime and the acetic anhydride can be used in equimolar quantities although it is preferred to use at least 2 moles of acetic anhydride for each mole of oxime. The reaction proceeds at a satisfactory rate under a hydrogen pressure of 15 to 100 pounds per square inch and at room temperature and is continued until the calculated amount (two molecular equivalents) of hydrogen has been absorbed, which generally requires less than 4 hours. The product recovered from the reaction mixture is crude N-acetyl-3-(3,4-dimethoxyphenyl)-alanine, lower alkyl ester, which can be used in the second step of the sequence without purification. In this second step, the product identified above is treated with an aqueous base whereby selective hydrolysis of the lower alkyl ester group occurs without substantial hydrolysis of the N-acetyl group. The particular base, the reaction temperature, the reaction time, and the pH are chosen to cause this selective hydrolysis. According to the preferred conditions, the N-acetyl-3-(3,4-dimethoxyphenyl)alanine, lower alkyl ester, is heated at 50°–60 C. in aqueous methanol for 20–30 minutes with sufficient sodium hydroxide to bring the pH to 10–12. An increase in reaction temperature, reaction time, or pH tends to promote hydrolysis with risk of substantial hydrolysis of the N-acetyl group. A decrease in reaction temperature, reaction time, or pH tends to decrease hydrolysis with risk of incomplete hydrolysis of the lower alkyl ester group. Accordingly, a significant increase in one of these variables is compensated for by an equivalent decrease in one of the other variables. In the third step of the sequence, the salt of N-acetyl-3-(3,4-dimethoxyphenyl)alanine resulting from the hydrolysis step is converted by acidification to N-acetyl-3-(3,4-dimethoxyphenyl)alanine in free acid form. A mineral acid such as hydrochloric acid, or a strong organic acid, is suitable for this purpose.

The compounds described herein can exist in anhydrous form as well as in solvated, including hydrated, forms. In general, the solvated forms are equivalent to the anhydrous or unsolvated form for the purposes of the invention.

The new compounds of the invention are useful as chemical intermediates and especially as chemical intermediates in the synthetic production of the naturally-occurring amino acid and pharmacological agent, 3-(3,4-dihydroxyphenyl)-L-alanine, otherwise known as L-DOPA. The new chemical processes of the invention are also useful as intermediate steps in the production of 3-(3,4-dihydroxyphenyl)-L-alanine. For example, a 3,4-dimethoxyphenylpyruvic acid, lower alkyl ester, oxime is converted as described herein to N-acetyl-3-(3,4-dimethoxyphenyl)alanine. The latter compound is subjected to the enzymatic action of an acylase from *Aspergillus oryzae* whereby deacetylation and resolution occur with the production of 3-(3,4-dimethoxyphenyl)-L-alanine, leaving as an unreacted by-product N-acetyl-3-(3,4-dimethoxyphenyl)-D-alanine. The 3-(3,4-dimethoxyphenyl)-L-alanine is then converted by heating with concentrated hydrobromic acid or other ether cleavage agent, and adjustment of the pH, to 3-(3,4-dihydroxyphenyl)-L-alanine.

The new compounds and chemical processes of the invention afford significant advantages in the production of 3-(3,4-dihydroxyphenyl)-L-alanine. 3,4-Dimethoxyphenylpyruvic acid, oxime (herein designated "acid oxime") is a known compound and can be used as a chemical intermediate in the production of 3-(3,4-dihydroxyphenyl)-L-alanine by conversion to N-acetyl-3-(3,4-dimethoxyphenyl)alanine. However, both the production and use of 3,4-dimethoxyphenylpyruvic acid, lower alkyl esters, oximes (herein designated "ester oxime") afford advantages over the production and use of the acid oxime. These advantages are especially important in large scale production.

For example, the production of the acid oxime by oximation of 3,4-dimethoxybenzylmalonic acid is carried out in an expensive ether such as tetrahydrofuran or a dangerous ether such as diethyl ether in the presence of a corrosive agent such as hydrogen chloride. On the other hand, the production of the ester oxime, according to the present invention, can be carried out in a lower alkanol in the presence of base. The acid oxime is more difficult to purify and to dry than the ester oxime. The acid oxime is partly decomposed by the hydrogen chloride present during its production and moreover it partly decarboxylates when it is heated so that it must be dried without heating. The ester oxime, according to the present invention, can be hydrogenated and the product simultaneously acetylated with acetic anhydride, with the production of N-acetyl-3-(3,4-dimethoxyphenyl)alanine, lower alkyl ester, in good yield. Under similar conditions, the acid oxime does not give as good a yield of N-acetyl-3-(3,4-dimethoxyphenyl)alanine because of the formation of an azlactone by reaction between acetic anhydride and the amino acid formed as a product of the hydrogenation.

The invention is illustrated by the following examples.

EXAMPLE 1

With stirring, 190 g. of sodium methoxide is dissolved in a solution of 940 g. of 3,4-dimethoxybenzylmalonic acid, dimethyl ester, in 2.5 liters of methanol. The solution is chilled to −15° C. and treated with a stream of methyl nitrite while the temperature is maintained at −20° to −15° C. The methyl nitrite used in this procedure is produced as follows. Over a period of one hour, 475 ml. of cold aqueous sulfuric acid (prepared by pouring one volume of concentrated sulfuric acid into two volumes of water) is added to a methyl nitrite generator containing 287 g. of sodium nitrite, 185 ml. of methanol, and 177 ml. of water. The methyl nitrite is passed through a calcium sulfate drying tower into the reaction mixture as described above. When the addition of methyl nitrite is complete, the temperature of the reaction mixture is allowed to rise to 0° C. over a period of 2½ hours. The solution is neutralized with concentrated sulfuric acid while maintaining the temperature at 0°–5° C. and is then concentrated to a volume of 1.5 liters, diluted with 3 liters of water, and chilled. The insoluble product is collected on a filter, washed with water, and dried under reduced pressure. It is 3,4-dimethoxyphenylpyruvic acid, methyl ester, oxime; m.p. 111.5°–113° C. In the same manner, by the substitution of an equivalent amount of 3,4-dimethoxybenzylmalonic acid, diethyl ester, for the 3,4-dimethoxybenzylmalonic acid, dimethyl ester, and using sodium ethoxide in ethanol, the product obtained is 3,4-dimethoxyphenylpyruvic acid, ethyl ester, oxime.

Each of the above oximes is converted to a sodium salt and a potassium salt by reaction with aqueous sodium hydroxide and aqueous potassium hydroxide. Each of the above oximes is converted to a hydrochloride by reaction with hydrogen chloride in dioxane-diethyl ether.

EXAMPLE 2

A mixture of 50.6 g. of 3,4-dimethoxyphenylpyruvic acid, methyl ester, oxime, 400 ml. of acetic acid, 42 ml. of acetic anhydride, and 1.0 g. of 20 percent palladium on charcoal catalyst is shaken with hydrogen at room temperature and at an initial pressure of 50 pounds per square inch until the theoretical amount of hydrogen (two molecular equivalents) has been absorbed. The catalyst is removed by filtration and the filtrate is evaporated under reduced pressure to give a residue of N-acetyl-3-(3,4-dimethoxyphenyl)alanine, methyl ester. This product is dissolved in 200 ml. of 50 percent aqueous methanol. The solution is heated to 60° C. and 20 percent aqueous sodium hydroxide is added slowly with stirring to bring the pH to and maintain it at 10–12. Preferably the pH is stabilized at 10.5–11 whereupon the solution is stirred an additional 20 minutes and then evaporated at reduced pressure to remove most of the methanol. The volume is adjusted to 225 ml. by dilution with water. The solution, containing N-acetyl-3-(3,4-dimethyoxyphenyl)alanine, sodium salt, is acidified with concentrated hydrochloric acid to pH 1 and cooled. The insoluble product is collected on a filter, washed with cold water, and dried. This product is suitable for use without further purification. If further purification is desired, it is crystallized from water. The product is N-acetyl-3-(3,4-dimethoxyphenyl)alanine (in the form of a monohydrate); m.p. 107°–109° C.

PRODUCTION OF 3-(3,4-DIHYDROXYPHENYL)-L-ALANINE

A suspension of 267 g., calculated as anhydrous form, of N-acetyl-3-(3,4-dimethoxyphenyl)alanine in 1,500 ml. of deionized water is adjusted to pH 7.3 with concentrated aqueous ammonia. With continuous stirring, the resulting solution is treated with 10 ml. of 0.1 M cobaltous chloride, 50 ml. of 1 percent formaldehyde, and 12 g. of *Aspergillus oryzae* enzymes. A suitable preparation of *Aspergillus oryzae* enzymes is the product known as Taka-Diastase, produced by *Aspergillus oryzae* grown on wheat bran, or an enzymatically equivalent product. Taka-Diastase is a mixed enzyme including an amylase and an acylase. The purified acylase fraction is sometimes also known as Taka-acylase; Journal of Biochemistry, 48, 603–616 (1960). An equivalent amount of the purified acylase fraction can be used in place of a mixed enzyme. The solution is warmed to 37° C., diluted with water to 2.5 liters, readjusted with aqueous ammonia or with acetic acid to pH 7.3, and incubated at 37° C. for a total of 4 days. After the first 5 hours, the pH is readjusted to 7.3–7.35. After the 4-day incubation period, the mixture is chilled to 10° C. and filtered. The insoluble product is washed with 150 ml. of cold water, with 150 ml. of isopropyl alcohol, with 200 ml. of 50 percent isopropyl alcohol-ether, and then with dry ether. The product is dried in vacuo. It is 3-(3,4-dimethoxyphenyl)-L-alanine; m.p. 265°–268° C.; $[\alpha]_D^{25} = -4.3°$ ($c = 5$ percent in 1.0 N hydrochloric acid).

A somewhat improved yield is obtained by the following procedure. A suspension of 468 g., calculated as anhydrous form, of N-acetyl-3-(3,4-dimethoxyphenyl)alanine in 1,500 ml. of deionized water, is adjusted to pH 7.5 with concentrated aqueous ammonia. With continuous stirring, the resulting solution is treated with 10 ml. of 0.1 M cobaltous chloride, 100 ml. of 1 percent formaldehyde, and 22 g. of *Aspergillus oryzae* enzymes. A suitable preparation of *Aspergillus oryzae* enzymes is the product known as Taka-Diastase, produced by *Aspergillus oryzae* grown on wheat bran, or an enzymatically equivalent product. The solution is warmed to 37° C., diluted with water to 2.5 liters, readjusted with aqueous ammonia or with acetic acid to pH 7.5, and incubated at 37° C. for a total of 4 days. After the first 5 hours, the pH is readjusted to 7.5. After the 4-day incubation period, the mixture is chilled to 10° C. and filtered. The insoluble product is washed with 150 ml. of cold water, with 150 ml. of isopropyl alcohol, with 200 ml. of 50 percent isopropyl alcohol-ether, and then with dry ether. The product is dried in vacuo. It is 3-(3,4-dimethoxyphenyl)-L-alanine; m.p. 265°–268° C.; $[\alpha]_D^{25} = -4.3°$ ($c = 5$ percent in 1.0 N hydrochloric acid). Similar results are obtained by carrying out the incubation at 45° C. rather than 37° C.

A mixture of 101 g. of 3-(3,4-dimethoxyphenyl)-L-alanine and 500 ml. of 48 percent hydrobromic acid is heated at reflux for 3 hours and then distilled almost to dryness under reduced pressure. The residual gummy product is stirred with 500 ml. of a solution prepared by dissolving 100 g. of anhydrous sodium acetate in a mixture of 900 ml. of methanol and 100 ml. of water. Stirring is continued until the gum is gone and a solid precipitate remains. The precipitated product is collected on a filter and washed well with water, with isopropyl alcohol, and with dry ether. This product is dissolved in 300 ml. of 0.5 M hydrochloric acid and the solution is stirred with acid-washed charcoal, filtered, and adjusted to pH 4.5 with saturated aqueous sodium acetate. The insoluble product is collected on a filter, washed with 50 ml. of water, 150 ml. of isopropyl alcohol, and 300 ml. of dry ether. It is 3-(3,4-dihydroxyphenyl)-L-alanine; m.p. 284°–286° C.; $[\alpha]_D^{25} = -11.25°$ ($c = 5$ percent in 1.0 N hydrochloric acid).

I claim:
1. A member of the class consisting of compounds of the formula

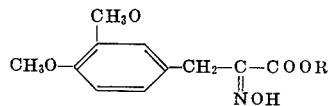

and alkali metal and mineral acid salts thereof; where R represents lower alkyl.

2. A compound according to claim 1 which is 3,4-dimethoxyphenylpyruvic acid, methyl ester, oxime.

3. Process for the production of N-acetyl-3-(3,4-dimethoxyphenyl)alanine which comprises the sequence of (a) reacting a 3,4-dimethoxyphenylpyruvic acid, lower alkyl ester, oxime with hydrogen and acetic anhydride in the presence of a hydrogenation catalyst, (b) reacting the resulting N-acetyl-3-(3,4-dimethoxyphenyl)alanine, lower alkyl ester, with an aqueous base at a pH of 9 to 13 whereby selective hydrolysis of the lower alkyl ester group occurs without substantial hydrolysis of the N-acetyl group, and (c) reacting the resulting salt of N-acetyl-3-(3,4-dimethoxyphenyl)alanine with an acid to produce N-acetyl-3-(3,4-dimethoxyphenyl)-alanine in free acid form.

4. Process according to claim 3 wherein the hydrogenation catalyst is palladium on charcoal.

5. Process according to claim 3 wherein the selective hydrolysis is carried out in aqueous methanol at a temperature of substantially 50° to 60° C. and a pH of substantially 10 to 12.

* * * * *